C. NEIMEYER.
RESILIENT WHEEL.
APPLICATION FILED MAR. 18, 1916.
1,228,809.
Patented June 5, 1917.
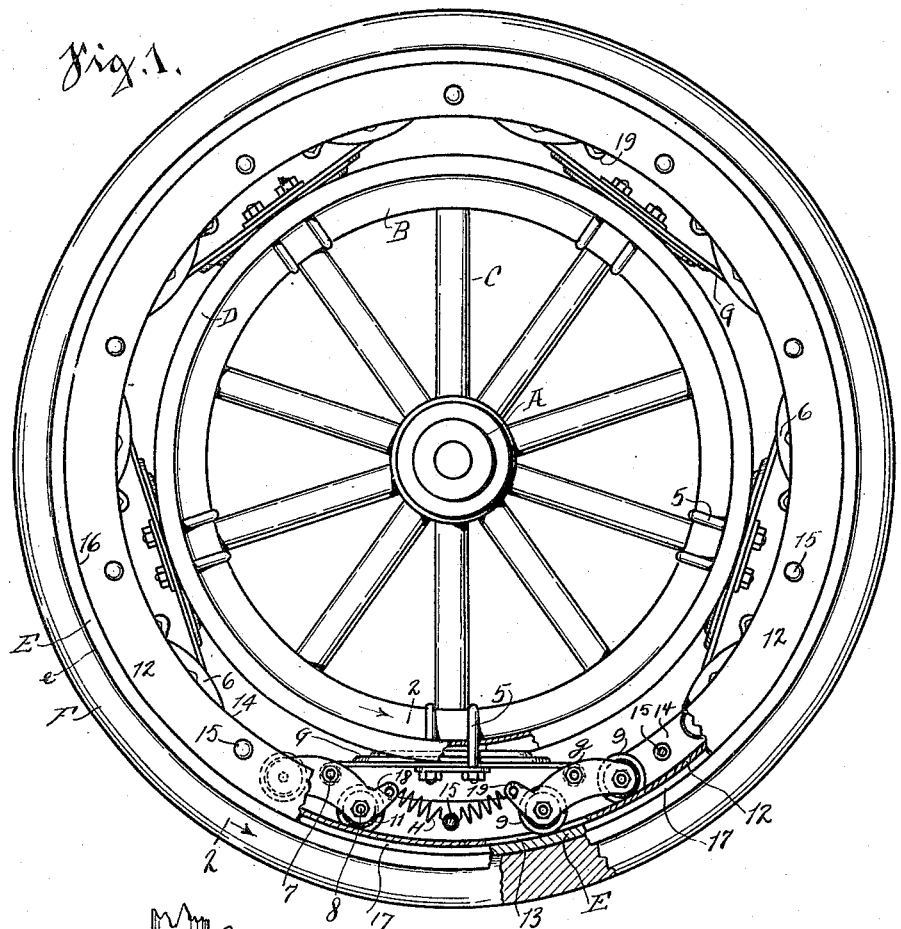
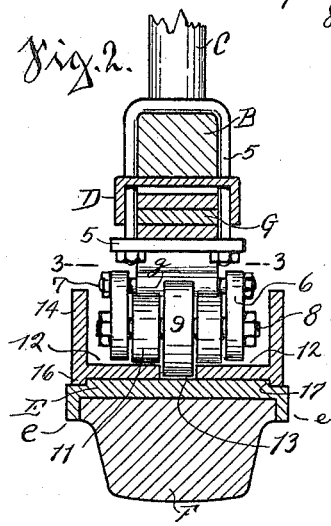
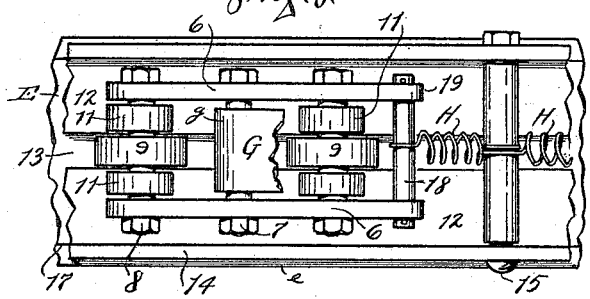
Inventor,
Charles Neimeyer
by C. Spengel atty

UNITED STATES PATENT OFFICE.

CHARLES NEIMEYER, OF LITTLE ROCK, ARKANSAS.

RESILIENT WHEEL.

1,228,809.	Specification of Letters Patent.	Patented June 5, 1917.

Application filed March 18, 1916. Serial No. 85,193.

*To all whom it may concern:*

Be it known that I, CHARLES NEIMEYER, residing at Little Rock, Pulaski county, State of Arkansas, have invented certain new and useful Improvements in Resilient Wheels, of which the following is a clear, full, and exact description, attention being called to the drawing which accompanies this application and forms a part thereof.

This invention relates to improvements in the construction of vehicle wheels, more particularly automobile wheels in which springs are used to impart the resiliency generally provided by pneumatic tires, for the purpose of neutralizing vibrations of the axle and to overcome and counteract effects of contact with rough and uneven ground over which the wheels travel.

The invention concerns more particularly improved means for supporting the springs and consists of the particular construction hereinafter described and pointed out in the claims.

This construction is also illustrated in the accompanying drawing in which:

Figure 1, shows my improved wheel in side elevation and with parts broken away and shown in section.

Fig. 2, is an enlarged cross-section of certain parts and taken on a line indicated at 2—2 of Fig. 1.

Fig. 3, is a view of the lower part of Fig. 2, and as the same appears below a line indicated at 3—3 in Fig. 2.

In the drawing letter A indicates the hub which contains the bearing for the axle. The felly is shown at B, and C are the spokes whereby hub and felly are connected and positioned with reference to each other.

My construction provides two concentric rims, an inner one and an outer one, shown respectively at D and E. The inner rim is mounted upon felly B, and forms practically a part thereof so that, as far as function is concerned, one is the equivalent of the other and both might be combined in one member.

The outer rim which is spaced from the inner one is provided at its edges with two outwardly extending flanges e—e which between them receive a cushion tire F. Springs are placed in the space between the two rims from which the resiliency required for the wheel is obtained. I use a combination of springs consisting of leaf-springs and of coil-springs and they are arranged in sets comprising one or more leaf-springs G and two coil-springs H—H. Any suitable number of these spring-sets may be used, five being shown in the present case. These sets are arranged and constructed as follows, the description of one set serving for all. The leaf-springs G are connected between their ends to the inner rim and to the felly by customary clips 5. Each end of these springs is connected to a truck mounted on rollers and comprising a frame which consists of two parallel members 6. The connection of one end of a spring to a truck is in the form of a hinged joint and is effected by a bolt 7, mounted in the truck frames and passing through eyes $g$ formed at the ends of the longest leaf of springs G. The rollers upon which these trucks rest are mounted between the ends of the truck frames and upon bolts 8 seated in said frames and serving also to hold the frame members to each other to form the truck. Three rollers are mounted upon each bolt at each end of the truck, a larger one 9, in the center, and two smaller ones 11—11 on each side thereof.

The smaller rollers rest upon two annular roller beds 12, which are fitted against the inner side of the outer rim E and with a space between them to receive the larger roller for which this space forms a guide way 13. At their outer edges these roller-beds have flanges extending in both directions, inwardly as well as outwardly. The inwardly extending parts 14 of these flanges, receive tie-bolts 15, whereby their outwardly extending parts 16, are held against shoulders 17 on the outer rim E, of which these roller beds form practically parts. Any number of such tie-bolts, suitably distributed may be used. However I locate one of them between the two trucks of each spring-set and connect each truck to this bolt by a coil-spring H, connecting thereby also the outer rim to the inner rim by means of these spring sets. The connection of these coil-springs to the trucks is by means of bars 18, one of which is provided in each truck and supported between the frame members thereof by means of lugs 19, in which these bars are seated.

It will now be seen that the axle is carried by the inner rim which may readily yield when the vehicle is under load and neutralize effects of travel, being cushioned and sustained by the springs between it and the outer rim. Vibrations at the ends of the leaf-springs are transferred to the trucks which are free to travel in either direction on the roller beds on the outer rim. This travel is held to proper direction longitudinally by guide-way 13, in which the central roller trucks move and which prevents lateral displacement.

Having described my invention I claim as new:

1. In a resilient wheel, the combination of inner and outer rims, laterally spaced annular roller-beds connected to the inner side of the outer rim with a space between them which forms an annular guide-way, trucks provided with rollers seated on these roller beds on which they are adapted to move and comprising also rollers which are larger in diameter and extend into these guide-ways, springs to connect these trucks to the outer rim and additional springs to connect them to the inner rim.

2. In a resilient wheel, the combination of an inner rim, an outer rim spaced therefrom and provided with a guide-way between its edges, trucks comprising spaced frame members provided in the space between the rims, three rollers mounted between the frame members at each end of the trucks and seated on the outer rim with the central roller at each end occupying the guide-way mentioned, springs connecting these trucks to the inner rim and additional springs for connecting them to the outer rim.

In testimony whereof, I hereunto affix my signature.

CHARLES NEIMEYER.

Copies of this patent may be obtained for five cents each, by addressing the "Commissioner of Patents, Washington, D. C."